United States Patent [19]
Saitoh et al.

[11] Patent Number: 5,695,867
[45] Date of Patent: Dec. 9, 1997

[54] REINFORCING AND VIBRATION-DAMPING MATERIAL

[75] Inventors: Masahiko Saitoh, Tokorozawa; Akihiko Takano, Urawa; Masao Kogure, Hukiage-machi; Takanori Saitoh, Misato, all of Japan

[73] Assignee: Lintec Corporation, Japan

[21] Appl. No.: 472,516

[22] Filed: Jun. 7, 1995

[30] Foreign Application Priority Data

Jul. 25, 1994 [JP] Japan ................................ 6-193671

[51] Int. Cl.⁶ .................... B32B 15/04; B32B 11/00
[52] U.S. Cl. .................... 428/219; 428/220; 428/457; 428/465; 428/489; 428/492; 428/543
[58] Field of Search ........................ 428/40, 219, 220, 428/340, 489, 492, 543, 457, 465

[56] References Cited

U.S. PATENT DOCUMENTS

| | | | |
|---|---|---|---|
| 3,562,089 | 2/1971 | Warnaka et al. | 161/166 |
| 3,658,635 | 4/1972 | Eustice | 161/190 |
| 4,056,161 | 11/1977 | Allen, Jr. | 181/290 |
| 4,278,726 | 7/1981 | Wieme | 428/229 |
| 4,347,280 | 8/1982 | Lau et al. | 428/304.4 |
| 4,778,028 | 10/1988 | Staley | 181/208 |
| 4,981,737 | 1/1991 | Rico | 428/40 |
| 5,213,879 | 5/1993 | Niwa et al. | 428/213 |
| 5,262,232 | 11/1993 | Wilfong et al. | 428/327 |
| 5,300,355 | 4/1994 | Mifune et al. | 428/215 |
| 5,338,599 | 8/1994 | Barrett | 428/212 |
| 5,358,772 | 10/1994 | Nakagawa et al. | 428/148 |
| 5,474,840 | 12/1995 | Landin | 428/294 |

FOREIGN PATENT DOCUMENTS

| | | |
|---|---|---|
| 513171 | 10/1939 | United Kingdom. |
| 2 113 346A | 8/1983 | United Kingdom. |
| WO82/04454 | 12/1982 | WIPO. |

OTHER PUBLICATIONS

Article entitled *"Frequency And Loss Factors of Sandwich Beams Under Various Boundary Conditions"*, D.K. Rao, Journal Mechanical Engineering Science, vol. 20, No. 5, 1978, pp. 271–282.

*Primary Examiner*—H. Thi Le
*Attorney, Agent, or Firm*—Brinks Hofer Gilson & Lione; G. Peter Nichols

[57] ABSTRACT

A reinforcing and vibration-damping material has a laminate body which includes a constraining layer acting to reinforce an adherend to which the material is to be applied, a vibration-damping layer acting to damp vibrations in the adherend and a binder layer interposed between the constraining layer and the vibration-damping layer. Further, a hardenable pressure sensitive adhesive layer is formed on the vibration-damping layer of the laminate body, and a release liner is placed around the hardenable pressure sensitive adhesive layer. The constraining layer exhibits the advantageous effect of reinforcing the adherend, and comprises, for example, a hard material such as a metal. The binder layer comprises a pressure sensitive adhesive, a bonding agent or a hardenable pressure sensitive adhesive. The vibration-reinforcing layer comprises a viscoelastic material containing unvulcanized rubber and a vulcanizing agent for example. The hardenable pressure sensitive adhesive layer comprises a hardenable pressure sensitive adhesive which is tacky in the uncured state but has a strong adhesive force when it is cured by heating, irradiation or being blocked from air. Thus constructed, the reinforcing and vibration-damping material has the advantageous effects of damping vibrations in and reinforcing the adherend.

14 Claims, 2 Drawing Sheets

Fig. 4 ion and vibration-damping material of the present invention exhibits excellent reinforcing performance, and vibration-damping performance, and gives highly reliable adhesion without reducing operational efficiency when it is applied to the adherend.

REINFORCING AND VIBRATION-DAMPING MATERIAL

BACKGROUND OF THE INVENTION

1. Field of the Invention

The present invention relates to a reinforcing and vibration-damping material which has the function of reinforcing an adherend (a body to which the material is to be applied) as well as the function of damping vibrations.

2. Description of the Background Art

Steel panels used in automobiles have shown a tendency to become thinner over recent years in order to reduce weight. Therefore, in locations where strength is particularly required, deficiencies in strength have been compensated for by applying a sheet-shaped reinforcing material comprising a thermosetting resin such as an epoxy resin.

Meanwhile, an important consideration in automobiles is maintaining silence within the interior of the vehicle. For this purpose, vibration-damping sheets, having a viscoelastic layer (vibration-damping layer) which absorbs vibrations and noise, are utilized.

However, reinforcing properties and vibration-damping properties, as mentioned above, are generally mutually exclusive properties. In other words, if the reinforcing properties are improved the vibration-damping properties are reduced, and If vibration-damping properties are given priority then adequate reinforcing properties will not be obtained.

For this reason, reinforcing sheets and vibration-damping sheets have been separately applied to locations where both reinforcement and vibration-damping are required.

Further, the above-mentioned reinforcing sheet and vibration-damping sheet are applied on to the body or adherend utilizing a bonding agent or a pressure sensitive adhesive. However, this method has disadvantages.

Methods involving adhesion to the adherend utilizing a bonding agent suffer from poor operational efficiency since they require time to coat and dry the bonding agent. Further, methods involving applying the adherend using a pressure sensitive adhesive suffer poor adhesive reliability since there is a risk that the pressure sensitive adhesive will peel, for example, when vibrations and shocks are sustained during running, or when the temperature changes (e.g. under heating during paint baking or under environmental temperature changes). And, if the pressure sensitive adhesive is removed, the reinforcing effect is lost in the reinforcing sheet, and the vibration-damping action is lost in the vibration-damping sheet.

SUMMARY OF THE INVENTION

The main objective of the present invention is to provide a reinforcing and vibration-damping material which has both the ability to reinforce the adherend (the body to which the material is to be applied) and the ability to dampen vibrations. An additional objective of the present invention is to provide a reinforcing and vibration-damping material which provides a high degree of adhesive reliability without impairing operational efficiency in applying it to the adherend.

In order to achieve the above-mentioned objectives, the reinforcing and vibration-damping material of the present invention comprise a laminate body which includes a constraining layer acting to reinforce an adherend, a vibration-damping layer acting to damp vibrations in the adherend and a binder layer interposed between the constraining layer and the vibration-damping layer which laminates them.

The reinforcing and vibration-damping material of the present invention exhibits excellent reinforcing performance, and vibration-damping performance, and gives highly reliable adhesion without reducing operational efficiency when it is applied to the adherend.

Further, the reinforcing and vibration-damping material of the present invention has an excellent adaptability to the shape of the adherend, and therefore, it can be easily applied to curved surfaces.

The reinforcing and vibration-damping material of the present invention further includes a hardenable pressure sensitive adhesive layer provided on the vibration-damping layer of the laminate body and a release liner placed around the hardenable pressure sensitive adhesive layer.

Further, a barrier layer, which blocks the migration of organic components, is provided between the vibration-damping layer and the hardenable pressure sensitive adhesive layer.

The reinforcing and vibration-damping material of the present invention further includes a hardenable pressure sensitive adhesive layer positioned on the constraining layer of the laminate body and a release liner positioned around the hardenable pressure sensitive adhesive layer.

In the preferred embodiment of the present invention, the vibration-damping layer is preferably formed of a visco-elastic material which contains unvulcanized rubber as a main component and a vulcanizing agent.

It is also preferred that the visco-elastic material of the vibration-damping layer is one in which the viscosity of the rubber (JIS K-6300 Rotor L Model Mooney viscometer $ML_{1+4}$ (100° C.)) before vulcanization is 10 to 80.

In addition, it is also preferred that the vibration-damping layer is one in which the modulus of dynamic shearing elasticity after vulcanization is $1 \times 10^6$ to $1 \times 10^{10}$ dyn/cm$^2$.

It is also preferred that the vibration-damping layer is formed of an elastomer material, containing rubber and asphalt.

It is preferred that the binder layer comprises a pressure sensitive adhesive, a bonding agent or a hardenable pressure sensitive adhesive.

It is also preferred that the hardenable pressure sensitive adhesive layer is formed of a material containing a sticking polymer, a reactive oligomer and a polymerization initiator.

Other objects, features and advantages of the present invention will become apparent from the following detailed description of the invention taken in conjunction with the accompanying drawings.

BRIEF DESCRIPTION OF THE DRAWINGS

FIG. 8 is a cross sectional view which illustrates yet another embodiment of the the reinforcing and vibration-damping material of the present invention.

DESCRIPTION OF THE INVENTION

The reinforcing and vibration-damping material of the present invention is described in detail below with reference to the preferred embodiments shown in the accompanying drawings.

Figure 1:
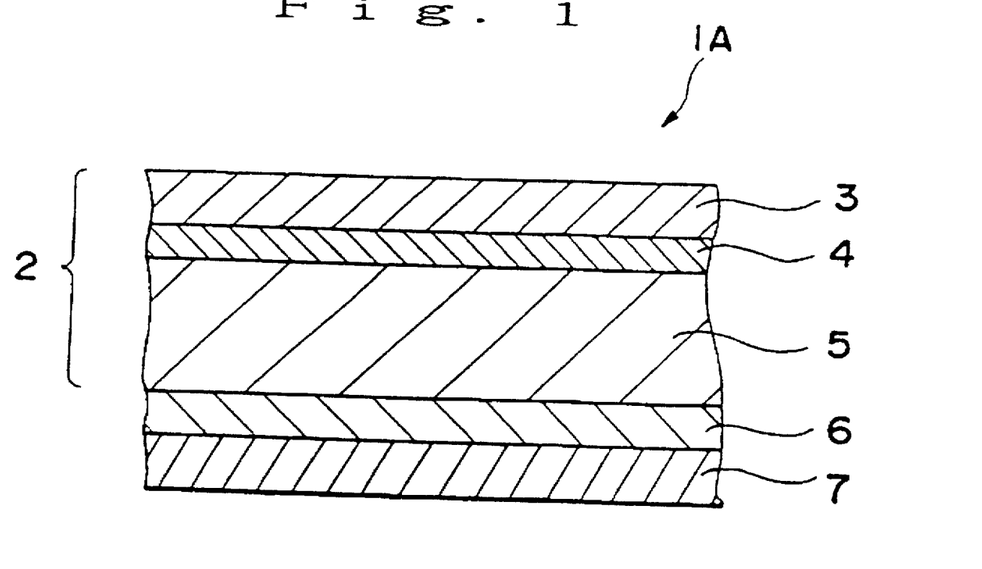
FIG. 1 is a cross-sectional view which illustrates one embodiment of the reinforcing and vibration-damping material of the present invention.

FIG. 1 is a cross section illustrating one embodiment of the reinforcing and vibration-damping material of the present invention. the reinforcing and vibration-damping material 1A is comprised of a laminate body 2 which is formed by laminating a constraining layer 3 and a damping layer 5 on opposite sides of a binder layer 4, interposed therebetween; a hardenable pressure sensitive adhesive layer 6 which is formed on the vibration-damping layer 5 of the laminate body 2; and a release liner 7 which is placed around the hardenable pressure sensitive adhesive layer 6. Each of these layers is described below.

[1] Constraining layer 3

The constraining layer's 3 main function is to reinforce the adherend. It is formed of a relatively hard material.

Materials which may be mentioned for the constraining layer 3 include, by way of example, various metals such as various steels, stainless steel, aluminum, copper, brass and titanium and alloys containing these; epoxy resins, phenolic resins, urea resins, hard polyvinyl chlorides, polyethylene (medium density or high density), polypropylene, polystyrene, polycarbonate, polyacetal, acrylic resins, poly (4-methyl-1-pentene), acrylonitrile-butadiene-styrene copolymers, polyethylene terephthalate, polybutylene terephthalate and other such polyesters; all aromatic polyesters, polyphenylene sulfide, polyether sulfone, polyether-ether ketone, polyether imide, polyamide, polyimide, polyamido imide and fluoro resins, polymethyl pentene and various other such resins or polymer alloys containing these. Further, the constraining layer 3 may comprise a laminate of two or more layers formed of different materials.

The modulus of dynamic shearing elasticity of the constraining layer 3 differs depending on the reasons for, the purpose of, the location of and the degree of reinforcement. However, when it is applied to an automobile body it is normally preferably about $1.0 \times 10^{10}$ to $3.0 \times 10^{12}$ dyn/cm$^2$, and more preferably about $1.0 \times 10^{11}$ to $2.5 \times 10^{12}$ dyn/cm$^2$.

[2] Binder layer 4

The binder layer 4 is a layer for bonding the constraining layer 3 with the vibration-damping layer 5. The binder layer may comprise a pressure sensitive adhesive, a bonding agent or a hardenable pressure sensitive adhesive.

(a) Pressure sensitive adhesive

The sticking polymer of which the pressure sensitive adhesive is composed may be an acrylic-based one, rubber-based one or silicone-based one. Among these polymers, acrylic-based ones are particularly preferred.

Substances which may be mentioned as representative of such sticking acrylic polymers are those consisting of polymers or copolymers whose main components are a low-Tg main monomer component which gives sticking properties, a high-Tg co-monomer component which gives sticking properties and cohesive strength, and a monomer component containing a functional group intended to improve crosslinking and bonding properties.

Substances which may be mentioned as representative of the main monomer component described above include ethyl acrylate, butyl acrylate, amyl acrylate, 2-ethylhexyl acrylate, octyl acrylate, cyclohexyl acrylate, benzyl acrylate and other such alkyl acrylate esters, and butyl methacrylate, 2-ethylhexyl methacrylate, cyclohexyl methacrylate, benzyl methacrylate and other such alkyl methacrylate esters.

Substances which may be mentioned as representive of the co-monomer component described above include methyl acrylate, methyl methacrylate, ethyl methacrylate, vinyl acetate, vinyl propionate, various vinyl ethers, styrene, acrylonitrile and methacrylonitrile.

Substances which may be mentioned as representive of the monomer component containing a functional group include monomers containing carboxyl groups such as acrylic acid, methacrylic acid, crotonic acid, maleic acid, fumaric acid and itaconic acid; monomers containing hydroxyl groups such as 2-hydroxyethyl acrylate or methacrylate, 2-hydroxypropyl acrylate or methacrylate, 4-hydroxybutyl acrylate or methacrylate, N-methylol acrylamide and allyl alcohol; monomers containing tertiary amino groups such as dimethyl aminoethyl acrylate or methacrylate, diethyl aminoethyl acrylate or methacrylate and dimethyl aminopropyl acrylate or methacrylate; monomers containing amido groups such as acrylamide and methacrylamide; monomers containing N-substituted amido groups such as N-methyl acrylamide or methacrylamide, N-ethyl acrylamide or methacrylamide, N-methoxymethyl acrylamide or methacrylamide, N-ethoxymethyl acrylamide or methacrylamide, N-t-butyl acrylamide and N-octyl acrylamide; and monomers containing epoxy groups such as glycidyl methacrylate.

The reason such materials are preferred is that they have excellent adhesive strength and cohesive strength and can obtain the quality and properties which are desired for a given application by selecting the type and molecular weight of the monomer.

Substances which may be mentioned as examples of the rubber-based pressure sensitive adhesive include ones based on natural rubber, isoprene rubber, styrene-butadiene, reclaimed rubber and polyisobutylene, and ones mainly comprising block copolymers containing rubbers such as styrene-isoprene-styrene, and styrene-butadiene-styrene.

Substances which may be mentioned as examples of the silicone-based pressure sensitive adhesive include dimethyl siloxane based and diphenyl siloxane based ones.

An excellent vibration-damping performance is obtained when such a pressure sensitive adhesive is used in the binder layer 4.

(b) Bonding agent

There are no particular limitations on the bonding agents which can be utilized. Therefore, examples of the adhesives include thermosetting resin adhesives mainly composed of phenolic resins, resorcin resins, furan resins, urea resins, melamine resins, polyester resins, polyurethane resins, epoxy resins and silicone resins or the like; thermoplastic resin adhesives mainly composed of polyvinyl acetate, polyvinyl alcohol, polyvinyl chloride, polyvinyl butyral, and, as discussed above, alkyl acrylate esters, alkyl methacrylate esters and nitrocellulose; rubber-based adhesives mainly composed of rubbers such as butadiene-acrylonitrile rubber and neoprene rubber; and natural adhesives such as glues, casein and gum arabic. In these cases, the adhesives may be liquid, in an organic solution or in an emulsion.

Among these bonding agents, epoxy-resin-based thermosetting adhesives are particularly preferred because they have excellent resistance to heat.

(c) Hardenable pressure sensitive adhesives

The same substances as those in the hardenable pressure sensitive adhesive layer 6 discussed below can be used.

The binder layers 4 are comprised of (b) bonding agents and (c) hardenable pressure sensitive adhesives. Those with a modulus of dynamic shearing elasticity of at least $1.0 \times 10^8$ dyn/cm$^2$ after curing are preferred, and those in which it is $1.0 \times 10^8$ to $1.0 \times 10^{10}$ dyn/cm$^2$ are more preferred. excellent reinforcing properties are obtained when the binder layer has such a modulus of dynamic shearing elasticity.

[3] Vibration damping layer 5

The vibration damping layer 5 exhibits a vibration damping action and shock-noise absorbing action (referred to in general as "vibration-damping action" or "vibration-damping properties" hereinbelow) with respect to the body to which the sheet is applied. It is made up of the following elastic materials or viscoelastic materials (precursors of elastic materials).

(a) Unvulcanized rubber

The preferable viscoelastic material is one which is mainly comprised of unvulcanized rubber to a which vulcanizing agent (crosslinking agent) has been added.

Unvulcanized rubbers which may be mentioned, by way of example, include natural rubber (NR), isoprene rubber (IR), butadiene rubber (BR, 1,2-BR), styrene-butadiene rubber (SBR) and other such butadiene rubbers; chloroprene rubber (CR), butadiene-acrylonitrile rubber (NBR) and other such diene-based speciality rubbers; butyl rubber (IIR), ethylene-propylene rubbers (EPM, EPDM), acrylic rubbers (ACM, ANM), halogenated butyl rubbers (X-IIR) and other such olefin-based rubbers; urethane rubbers (AU, EU) and other such urethane-based rubbers; hydrin rubbers (CO, EGO, GCO, EGCO) and other such ether-based rubbers; polysulfide rubbers (T) and other such polysulfide-based rubbers; silicone rubbers (Q), fluorine rubbers (FKM, FZ), polyethylene chloride (CM) and the like, or a blend of any desired two or more of these. Among these rubbers, NR, IR, BR, SBR, CR, NBR, IIR, ACM, ANM or a substance in which any one of these rubbers is utilized as a main constituent is particularly preferred.

Unvulcanized rubber in the present invention, is a concept which includes semi-vulcanized rubber, which has been partially vulcanized (partially crosslinked). For example, it refers to those in which the degree of partial crosslinking is 50% or less, and more particularly 20% or less.

There is no particular limit on the weight-average molecular weight of the unvulcanized rubber. However, 100,000 to 1,000,000 is preferred, and 200,000 to 700,000 is more preferred.

Vulcanizing agents (crosslinking agents) which may be mentioned include, for example, sulfur, peroxides, oxides of metals such as zinc and magnesium, selenium, tellurium and compounds thereof, and the azo-based compounds discussed hereinbelow. Among these agents, sulfur and organic peroxides are particularly preferred.

Powdered sulfur, sulfur flowers, deoxygenated sulfur, sediment sulfur, colloidal sulfur, surface-treated sulfur and the like can be used as the sulfur.

Various vulcanization accelerators can be added simultaneously with the sulfur vulcanization. Actual examples of vulcanization accelerators include, for example, tetramethylthiuram disulfide (TMTD), tetramethylthiuram monosulfide (TMTM), N-oxydiethylene-2-benzothiazolyl sulfenamide (OBS), N-cyclohexyl-2-benzothiazolyl sulfenamide (CBS), dibenzothiazyl disulfide (MBTS), 2-mercaptobenzothiazole (MBT), zinc di-n-butyl dithiocarbamate (ZnBDC), zinc dimethyl dithiocarbamate (ZnMDC), and zinc flowers.

Organic peroxides which may be mentioned include, for example, di-t-butyl peroxide, t-butylcumyl peroxide, dicumyl peroxide and other such dialkyl peroxides; acetyl peroxide, lauroyl peroxide, benzoyl peroxide and other such diacyl peroxides; methyl ethyl ketone peroxide, cyclohexanone peroxide, 3,3,5-trimethyl cyclohexanone peroxide, methyl cyclohexanone peroxide and other such ketone peroxides; 1,1-bis(t-butyl peroxy) cyclohexane and other such peroxyketals; t-butyl hydroperoxide, cumene hydroperoxide, 1,1,3,3-tetramethyl butyl hydroperoxide, p-menthane hydroperoxide, diisopropylbenzene hydroperoxide, 2,5-dimethylhexane-2,5-dihydroperoxide and other such hydroperoxides; t-butyl peroxyacetate, t-butylperoxy-2-ethyl hexanoate, t-butyl peroxybenzoate, t-butyl peroxyisopropyl carbonate and other such peroxy esters.

With such peroxide crosslinking, various polyfunctional monomers and the like can be added simultaneously. Actual examples of polyfunctional monomers which may be mentioned include trimethylolpropane trimethacrylate, ethylene glycol dimethacrylate, triallyl isocyanate and diallyl phthalate.

The amount of the above-mentioned sulfur vulcanizing agent which is added is preferably 1 to 100 parts by weight, and more preferably 50 to 90 parts by weight with respect to 100 parts by weight of the above-mentioned unvulcanized rubber. Further, the amount of the above-mentioned organic peroxide vulcanizing agent which is added is preferably 1 to 40 parts by weight, and more preferably 10 to 30 parts by weight with respect to 100 parts by weight of the above-mentioned unvulcanized rubber. If the amount of the vulcanizing agent is too small, then curing of the viscoelastic layer by crosslinking will be insufficient. If the amount of vulcanizing agent is too great, then the crosslinked article will deform and break or suffer similar deleterious effects due to the reaction heat during crosslinking.

When the vibration-damping layer 5 is comprised of a viscoelastic material, with the above-mentioned unvulcanized rubber as its main constituent, the reinforcing and vibration-damping material will easily change shape and follow the shape of the adherend to give close contact, even if the surface to which it is to be applied is somewhat uneven. When the constraining layer 3 is formed from flexible materials (for example when it is composed of a relatively thin metal plate) and because the viscoelastic material easily changes shape and has less restitutive force than an elastic material, it has an excellent ability to follow bent surfaces.

In this case, the viscosity (JIS K-6300 Rotor L Model Mooney viscometer $ML_{1+4}$ (100° C.)) of the rubber of the vibration-damping layer 5 before vulcanization is preferably 10 to 80, and more preferably 30 to 70. If the rubber viscosity before vulcanization is too low, then the operating efficiency and processability are low, and the vibration-damping properties of the vibration-damping layer after vulcanization tend to be impaired. On the other hand, if the rubber viscosity before vulcanisation is too high, the ability to follow the shape on the adherend is impaired.

The modulus of dynamic shearing elasticity of the vibration-damping layer 5 is preferably $1 \times 10^6$ to $1 \times 10^{10}$ $dyn/cm^2$, and more preferably $1 \times 10^7$ to $1 \times 10^8$ $dyn/cm^2$. If the modulus of dynamic shearing elasticity is too low, the reinforcing properties are impaired, while if the modulus of dynamic shearing elasticity is too high, the restitutive elasticity is increased and the vibration-damping properties are impaired.

(b) Elastomer material

Further, the vibration-damping layer 5 may consist of an elastomer material. Examples of such an elastomer material include vulcanized rubber obtained by vulcanizing the various unvulcanized rubbers discussed hereinabove, and various thermoplastic elastomers such as polyurethane elastomers, polyester elastomers, polyamide elastomers, polystyrene elastomers, fluoro-based elastomers and the like. In addition, it is also possible to use resin materials which are very flexible, such as soft polyvinyl chloride. Further, this elastomer material may also be a foamed body.

In this case, the hardness (JIS K-6301, JIS-A model hardness meter) of the rubber of the elastomer material of the vibration-damping layer 5 is preferably 40 to 100, and more preferably 60 to 90. If the hardness of the rubber of the elastomer material is too low, an adequate reinforcing effect is not obtained. On the other hand, if the hardness of the rubber in the elastomer material is too high, the restitution elasticity is increased and vibration damping is reduced.

Further, the modulus of dynamic shearing elasticity of the elastomer material in the vibration-damping layer 5 is preferably $1\times10^6$ to $1\times10^9$ dyn/cm$^2$, and more preferably $1\times10^7$ to $1\times10^9$ dyn/cm$^2$. If the modulus of dynamic shearing elasticity of the elastomer material is too low, the operating efficiency and sheet convertibility is reduced. On the other hand, if the modulus of dynamic shearing elasticity of the elastomer material is too high, the ability to follow the shape of the adherend is reduced.

(c) Rubber asphalt material

Materials containing rubber and asphalt (referred to as "rubber asphalt" hereinbelow) can be used as the materials which comprises the vibration-damping layer 5.

Various asphalts, such as petroleum-based asphalt and natural asphalt can be utilized as the asphalt. Further, the various rubbers mentioned above can be utilized as the rubber.

The amount of rubber added to the rubber asphalt is preferably about 1 to 20 parts by weight and more preferably about 1 to 10 parts by weight with respect to 100 parts by weight of asphalt.

Further, the fillers discussed hereinbelow may be added to the rubber asphalts. The amount of filler added to the rubber asphalt is preferably about 10 to 100 parts by weight, and more preferably 30 to 50 parts by weight with respect to 100 parts by weight of asphalt.

The vibration-damping layer 5 utilizing rubber asphalt can be formed using the coating method discussed hereinbelow. Alternatively, the vibration damping layer may be formed into a sheet shape by a method such as press forming, extrusion forming, calendar forming or the like.

Further, a softening agent (plasticizer) may be added to the vibration-damping layer 5.

Softening agents based on mineral oil, which are generally known as process oils or extender oils, can be utilized as the softening agent. Further, a mixture combining three constituents, namely aromatic rings, naphthene rings and paraffin rings, is preferred. Among these agents, paraffin based ones are those in which the number of carbon atoms in paraffin chains accounts for at least 50% of all the carbon atoms, naphthene based ones are those in which the number of naphthene ring carbon atoms is 30 to 45%, and aromatic ones are those in which the number of aromatic carbon atoms is greater than 30%. Any of these agents can be utilized as the softening agent.

The amount of softening agent which is added is preferably 0 to 100 parts by weight, and more preferably 10 to 50 parts by weight with respect to 100 parts by weight of the above-mentioned unvulcanized rubber.

Various fillers may be added to the vibration-damping layer 5 in order, for example, to improve the physical properties of the vibration-damping layer in use.

Fillers which can be utilized include various inorganic or organic fillers. As for the inorganic fillers which can be used, examples include silica, alumina, diatomaceous earths, titanium oxide, iron oxide, zinc oxide, magnesium oxide, metal ferrite and other such oxides; aluminum hydroxide, magnesium hydroxide and other such hydroxides; calcium carbonate (light and heavy), magnesium carbonate, dolomite, dawsonite and other such carbonates; calcium sulfate, barium sulfate, ammonium sulfate, calcium sulfite and other such sulfates and sulfites; talk, mica, clay, glass fiber, calcium silicate, montmorillonite, bentonite and other such silicates; zinc borate, barium metaborate, aluminum borate, calcium borate, sodium borate and other such borates; carbon black, graphite, carbon fibre and other such forms of carbon; as well as powdered iron, powdered copper, powdered aluminum, zinc flowers, molybdenum sulfate, boron fibre, potassium titanate, and lead titanate zirconate.

Synthetic resin powders can be utilized as the organic fillers. Examples of synthetic resin powders include powders of alkyd resins, epoxy resins, silicone resins, phenolic resins, polyester, acrylic resins, acetal resins, polyethylene, polyether, polycarbonate, polyamide, polysulfone, polystyrene, polyvinyl chloride, fluoro resins, polypropylene, ethylene/vinyl acetate copolymers and various other such thermosetting resins or powder of thermoplastic resins, or powders of copolymers of these resins. Additional examples of organic fillers which can be utilized include aromatic or aliphatic polyamide fibers, polypropylene fibers, polyester fibers and aramid fibers.

In the present invention, it is possible to utilize one or a mixture of two or more of the above inorganic or organic fillers.

The desirable amount of fillers added will differ depending on the type of filler. Normally, it will preferably be 0 to 600 parts by weight, and more preferably 10 to 400 parts by weight with respect to 100 parts by weight of the unvulcanized or vulcanized rubber mentioned above.

Furthermore, various inorganic or organic additives may be added to the vibration-damping layer 5 if required. For example, reinforcing agents, lubricants, anti-ageing agents, anti-mold agents, tackifiers, auxiliary processing agents, foaming agents or defoaming agents and pigments (colouring agents) or the like. Among these agents, antioxidants for rubber or metal dithiocarbamates are as examples of anti-ageing agents.

The rubber hardness and modulus of dynamic shearing elasticity in the above-mentioned viscoelastic material or elastic material can be appropriately adjusted by selecting and adjusting the types and amounts of the above-mentioned vulcanizing agents, softening agents and fillers.

The vibration-damping layer 5 consisting of a viscoelastic material, as described above, can be produced by mixing the above unvulcanized rubber, vulcanizing agent (crosslinking agent) and other necessary additives. These materials are formed into a sheet shape using a calendar roll, extruder or the like. Further, when forming a vibration-damping layer 5 of a resilient material, vulcanization is carried out under the conditions described hereinbelow. In addition, the vibration-damping layer 5 can be produced by the coating method described hereinbelow.

[4] Hardenable pressure sensitive adhesive layer 6

The hardenable pressure sensitive adhesive layer 6 comprises a pressure sensitive adhesive which is sticky in the uncured state, but will have a strong adhesive force when it is cured by heating, irradiation by light or blocked from air. One representative example of such a hardenable pressure sensitive adhesive is an adhesive containing (A) a sticking polymer, (B) a reactive oligomer (or monomer) and (C) a polymerization initiator. This example includes the thermo-curing type, light-curing type and anaerobically curing type. The constituents are described below.

(A) Sticking polymers

Any of the rubber-based, acrylic-based or silicone-based substances mentioned above may be used for the sticking polymers. However among these substances, the same sticking acrylic polymers as those mentioned for the binder layer 4 described above are particularly preferred.

(B) Reactive oligomers

Examples of reactive oligomers which may be mentioned include oligo acrylates or methacrylates having one or more acryloyl groups and/or methacryloyl groups in the molecule (referred to as "oligo acrylates or methacrylates" hereinbelow). The following types of substances can be mentioned as examples of the oligo acryates or methacryates.

(i) Vinyl ester resins (epoxy acrylate or methacrylate)

These are oligo acrylates or methacrylates having one or more acryloyl groups and/or methacryloyl groups in the molecule, obtained by reacting an epoxy resin with acrylic acid or methacrylic acid.

(ii) Polyester acrylates or methacrylates

These are oligo acrylates or methacrylates synthesized by bonding an acrylic acid or methacrylic acid with any desired polybasic acid and polyhydroxyl alcohol.

(iii) Polyurethane acrylates or methacrylates

These are oligo acrylates or methacrylates having one or more acryloyl groups and/or methacryloyl groups in the molecule, obtained by reacting an unsaturated alcohol jointly possessing a hydroxyl group, acryloyl group or methacryloyl group in the same molecule, a polyvalent isocyanate compound, polyhydroxyl compound or polyhydroxyl polymers.

(iv) Spiroacetal acrylates or methacrylates

These are oligo acrylates or methacrylates having a spiroacetal structure in the molecular structure, obtained by reacting the same unsaturated alcohols as in (iii) above, polyhydroxyl compounds or polymers with diallylidene pentaerythritol.

Further, other reactive oligomers which can be utilized include unsaturated polyester oligomers obtained by reacting compounds having a hydroxyl group, cyclic acid anhydrides and epoxides having ethylenically unsaturated groups (Such reactive oligomers are for example shown in Japanese Laid-Open Patent Publication No. Hei 5-9452).

Further, by way of other reactive oligomers, various allyl ether oligomers or polymers having the above-mentioned sticking polymers (A) as the main chain and unsaturated bonds as the side chains, may also be utilized. In this case, the hardenable pressure sensitive adhesive composition may, but need not, contain the sticking polymer of (A) mentioned above.

(C) Polymerization initiator

Examples of polymerization, initiators which can be utilized when the hardenable pressure sensitive adhesive is thermosetting or anaerobically, setting include the same organic peroxides as those mentioned in connection with the above-mentioned vibration-damping layer 5, and 2,2'-azobis (4-methoxy-2,4-dimethyl valeronitrile), 2,2'-azobis(2-cyclopropyl propyonitrile), 2,2'-azobis(2,4-dimethyl valeronitrile), azobis isobutyronitrile, 2,2'-azobis(2-methylbytyronitrile), 1,1'-azobis(cyclohexane-1-carbonitrile), 2-(carbamoylazo) isobutyronitrile, 2-phenylazo-4-methoxy-2,4-dimethylvaleronitrile and other such azo-based compounds.

There is no particular limit on the amount of such polymerization initiators which is may be utilized. However, it is preferably about 0.1 to 60 parts by weight, and more preferably about 1 to 50 parts by weight with respect to 100 parts by weight of the above-mentioned reactive oligomer of (B).

In addition, polymerization accelerators may be added. For example, it is preferable to add a polymerization initiator when using an organic peroxide with a reduced radical-generating rate.

As polymerization accelerators, it is possible to use tertiary amines such as N,N-dimethylbenzylamine, triethylamine, tributylamine, N,N-diethylaniline, N,N-dimethylaniline, N-phenyldiethanolamine, N-phenyldiisopropanolamine, dimethyl-p-toluidine, triethanolamine and 4-phenylmorpholine and the like. In addition, it is also possible to use metal compounds selected from aliphatic acid salts such as laurates, napthenates, octylates, oleates and octenates; resinates such as rosin salts; and chelate compounds such as the acetyl acetonate complex salts; and the like. Example of the metals which constitute such metal compounds include lithium, calcium, strontium, barium, cerium, zirconium, vanadium, molybdenum, manganese, iron, cobalt, nickel, copper, zinc, tin and lead and the like. In this case, one or two or more of the above-mentioned substances can be used as the polymerization accelerators.

In particular, when anaerobic curing is involved, it is preferred that a polymerization accelerator of a tertiary amine or metal compound, or both, is utilized in combination with organic peroxides. Among these polymerization accelerators, the tertiary amines are preferably used in a proportion of 1 to 100 parts by weight with respect to to 100 parts by weight of organic peroxide, and the metal compounds are preferably used in a proportion of 0.01 to 10 parts by weight with respect to 100 parts by weight of organic peroxide.

Examples of polymerization initiators utilized when the hardenable pressure sensitive adhesive is of a light-curing type include benzoin, benzoin methyl ether, benzoin ethyl ether, o-methyl-benzoylbenzoate, p-benzoate ethyl ether, benzoin isopropyl ether, α-methylbenzoin and other such benzoins; dimethylbenzyl ketal, trichloroacetophenone, 2,2-diethoxyacetophenone and other such acetopehnones; 2-hydroxy-2-methylpropiophenone, 2-hydroxy-4'-isopropyl-2-methylpropiophenone and other such propiophenones; a-acyloxym ester, benzophenone, methylbenzophenone, p-chlorobenzophenone, p-dimethylaminobenzophenone and other such benzophenones; 2-chlorothioxanthone, 2-ethylthioxanthone, 2-isopropylthioxanthone and other such thioxanthones; benzyl and dibenzosuberone.

There are no particular limits on the amount of such polymerization initiators which may be utilized. However, it is preferably about 0.05 to 20 parts by weight, and more preferably 0.5 to 10 parts by weight with respect to 100 parts by weight of the above-mentioned reactive oligomer of (B).

Further, such polymerization initiators may be used together with polymerization accelerators such as, for example, 4,4'-bis(diethylamine)benzophenone, N-(dimethylamino)ethyl benzoate, dimethylethanolamine and glycine.

Moreover, the above polymerization initiators and polymerization accelerators can also be formed into microcapsules before being added in order to improve stability in storage.

Furthermore, examples of other hardenable pressure sensitive adhesives which can be utilized in the present invention include ones which are disclosed in Japanese Patent Publication No. Sho 50-28970, Japanese Patent Publication No. Sho 53-31898, Japanese Laid-open Patent Publication No. 118439, Japanese Patent Publication No. Sho 54-28877, Japanese Laid-open Patent Publication No. Sho 60-69178, Japanese Patent Publication No. Sho 61-18591, Japanese Laid-open Patent Publication No. Sho 61-83273, Japanese Laid-open Patent Publication No. Sho 61-83274, Japanese Laid-open Patent Publication No. Sho 61-101583, Japanese Patent Publication No. Hei 1-36513, Japanese Patent Publication No. Hei 2-5791, Japanese Laid-open Patent Publication No. Hei 1-188508, Japanese Laid-open Patent Publication No. Hei 1-193314, Japanese Laid-open Patent Publication No. Hei 1-193315, Japanese Laid-open Patent Publication No. Hei 3-66779, Japanese Laid-open Patent Publication No. Hei 3-66780, Japanese Laid-open Patent Publication No. Hei 3-66781, Japanese Laid-open Patent Publication No. Hei 3-66782, Japanese Laid-open Patent Publication No. Hei 3-66783, and Japanese Laid-open Patent Publication No. Hei 3-66784.

Further, various additives can be added to the hardenable pressure sensitive adhesive layer 6 if required. For example, tackifiers, softening agents (plasticizers), fillers, anti-ageing agents and polyisocyanates or the like may be added to improve the cohesive strength. Examples of such tackifiers include rosin and derivatives thereof, polyterpene, terpene phenol resin, coumarone/indene resin, petroleum-based resins, styrene resins and xylene resins. Examples of such softening agents include liquid polybutene, mineral oil, lanolin, liquid polyisoprene and liquid polyacrylate. The same fillers and anti-ageing agents as those mentioned in connection with the vibration-damping layer 5 mentioned above can be utilized for the fillers and anti-ageing agents in the hardenable pressure sensitive adhesive layer 6.

The above hardenable pressure sensitive adhesive layer 6 can be formed by a coating method. A coating agent (viscosity of about 300 to 50,000 cps), comprising a mixture of (A) to (C) mentioned above with other necessary additives, is prepared and this is coated onto the vibration-damping layer 5 mentioned above or the silicone layer of a release liner which is discussed hereinbelow, and then they are dried. In this case, the coating agent may be organic solvent based, emulsion based or water based.

Coating methods which might be mentioned include brush coating, spatula coating, pressure spraying, spraying using an air spraying machine, an airless spraying machine or the like, flow coating, roll coating or dipping.

[5] Release liner 7

A release liner 7 is placed on the hardenable pressure sensitive adhesive layer 6 before it has been used. Any known release liner may be utilized as the release liner 7, and it is possible to use, for example, one in which a silicone layer has been formed on the surface where the base material bonds with the hardenable pressure sensitive adhesive layer 6. In this case, base materials for the release liner 7 can be formed from, for example, a paper material such as glassine paper, and a resin film consisting of polyethylene, polypropylene or polyester.

It should be noted that when the above-mentioned hardenable pressure sensitive adhesive layer 6 uses an anaerobically curing hardenable pressure sensitive adhesive, the release liner 7 is formed from one which is porous to air such as a paper material.

A reinforcing and vibration-damping sheet 1A, of the type described above, not only has excellent vibration-damping properties, but also excellent reinforcing properties. In particular, the reinforcing properties are excellent because the constraining layer 3 is utilized as the outermost layer.

Figure 2:
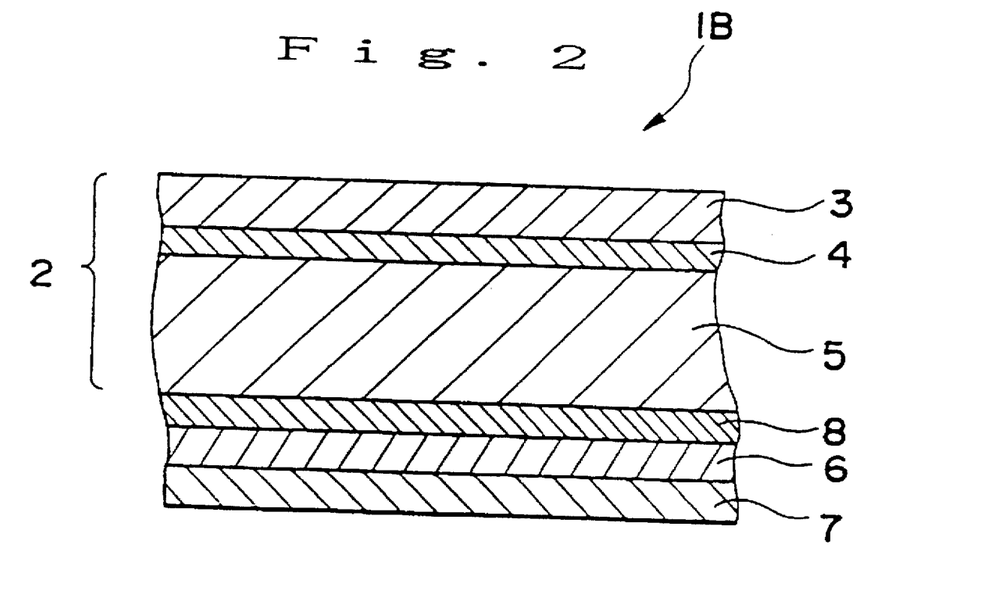
FIG. 2 is a cross sectional view which illustrates another embodiment of the the reinforcing and vibration-damping material of the present invention.

FIG. 2 is a cross sectional view showing a second embodiment of the vibration-damping or reinforcing sheet of the present invention. The reinforcing and vibration-damping sheet 1B shown in this figure is the same as the above-mentioned vibration-damping sheet 1A except that a barrier layer 8 has been introduced between the vibration-damping layer 5 and the hardenable pressure sensitive adhesive layer 6. In this case, the compositions of the constraining layer 3, the binder layer 4, the vibration-damping layer 5, the hardenable pressure sensitive adhesive layer 6 and the release liner 7 are the same as described above, and therefore, only the barrier layer 8 is discussed below.

[6] Barrier layer 8

The barrier layer 8 is intended to prevent (block) organic components contained in either the vibration-damping layer 5 or the hardenable pressure sensitive adhesive layer 6 from permeating and migrating into other layers.

For example, when the vulcanizing agent contained in the vibration-damping layer 5 is sulfur and the polymerization initiator contained in the hardenable pressure sensitive adhesive layer 6 is an organic peroxide, the organic peroxide can be prevented from migrating into the vibration-damping layer 5 by providing the barrier layer 8. In addition, it is also possible to prevent interference with and the vulcanization of the unvulcanized rubber in the vibration-damping layer 5 by providing the barrier layer 8.

Further, when one of the above-mentioned softening agents is included in the vibration-damping layer 5, and particularly when it has been added in a large amount, the liquid constituent of the softening agent (plasticizer) can be prevented from migrating into the hardenable pressure sensitive adhesive layer 6 by providing the barrier layer 8. As a result, denaturing and degradation of the hardenable pressure sensitive adhesive layer 6 or reduction in its adhesive strength and cohesion can be prevented by providing the barrier layer 8.

Constituent materials for such a barrier layer 8 which might be mentioned include, for example, polymers or copolymers mainly comprising acrylic acid, methacrylic acid or derivatives thereof. Examples of derivatives of acrylic acid or methacrylic acid include methyl acrylate, methyl methacrylate, ethyl acrylate, ethyl methacrylate, hydroxyethyl acrylate, hydroxyethyl methacrylate, hydroxypropyl acrylate, hydroxypropyl methacrylate, dimethylaminoethyl methacrylate and other such acrylic esters or methacrylic esters, acrylamide and acrylonitrile.

Further, examples of other constituent materials for the barrier layer 8 include polyether-based derivatives, polyester-based derivatives, polyurethane-based derivatives, silicone-based derivatives, polyimide-based derivatives, as well as polyvinylidene chloride (PVDC), polyvinyl alcohol (PVA), ethylene-vinyl alcohol copolymers (EVAL) and fluoro resins.

Particularly preferred constituent materials for the barrier layer 8 mentioned above are polyvinylidene chloride or polymers or copolymers mainly comprising acrylic esters or methacrylic esters.

The average molecular weight of the macromolecular materials typified by acrylic-based polymers, as mentioned above, is preferably about 50,000 to 5,000,000, and more preferably about 100,000 to 1,000,000.

Further, additives such as, for example, the above-mentioned fillers, degradation-preventing agents, crosslinking agents and viscosity-adjusting agents and the like can be added to the constituent material of the barrier layer 8 if required.

This barrier layer 8 can be formed by one of the above-mentioned coating methods. In this case, the coating liquid may be organic solvent based, emulsion based or an aqueous solution. Moreover, the viscosity of the coating liquid is preferably about 10 to 10,000 cps (at room temperature).

The above-mentioned barrier layer 8 preferably has hydrophilic properties when the blocked organic constituent is an oil constituent. To obtain hydrophilic properties, the material constituting the barrier layer 8 may itself have hydrophilic properties, or a conversion in which the layer 8 is rendered hydrophilic may be carried out using a method such as plasma converting or applying a surfactant on the surface of the barrier layer 8 after it has been formed.

Further, although this is not depicted, an intermediate layer such as an undercoating layer may be provided between the vibration-damping layer 5 and the barrier layer 8 or between the barrier layer 8 and the hardenable pressure sensitive adhesive layer 6. The main reason for forming this intermediate layer is to improve the bonding force between the barrier layer 8 and the vibration-damping layer 5 or hardenable pressure sensitive adhesive layer 6. An intermediate layer formed for the above reason preferably comprises a bonding agent of the type discussed above.

It should be noted that the formation of the intermediate layers is not limited to the bonding purpose mentioned above. Such an intermediate layer can also be provided on the vibration-damping sheet 1C discussed hereinbelow.

Figure 3:
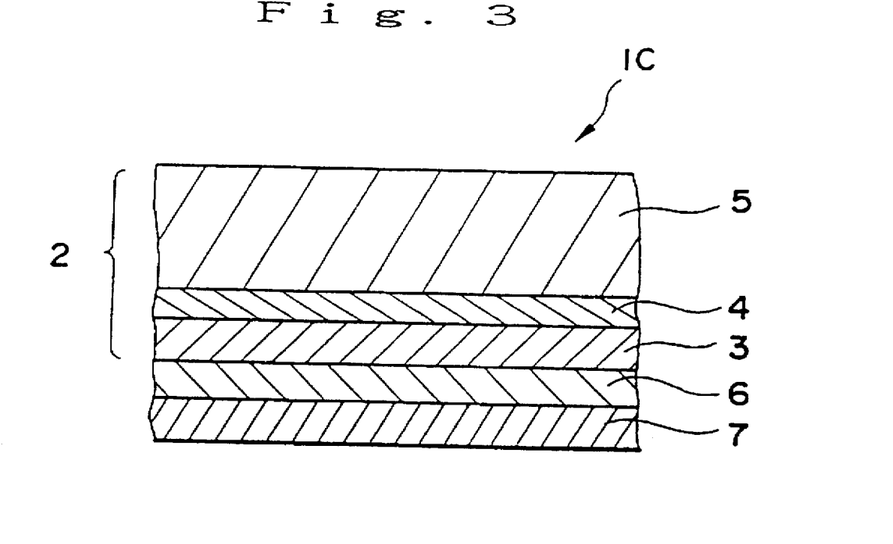

FIG. 3 is a cross sectional view illustrating a third embodiment of the reinforcing and vibration-damping sheet of the present invention. The reinforcing and vibration-damping sheet 1C shown in FIG. 3 is comprised of a hardenable pressure sensitive adhesive layer 6 which bonded to the constraining layer 3 of the laminate 2 discussed above, and a release liner 7 is placed around the hardenable pressure sensitive adhesive layer 6. This reinforcing and vibration-damping sheet 1C differs in the order in which the layers are formed, but such aspects as the compositions of the layers are the same as mentioned for the above-mentioned reinforcing and vibration-damping sheet 1A.

A reinforcing and vibration-damping sheet 1C with the above-described configuration will combine excellent reinforcing properties and vibration-damping properties. In particular, the vibration-damping properties will be improved because the vibration-damping layer 5 is utilized as the outermost layer and the constraining layer 3 utilized as the inside.

In the vibration-damping sheets 1A to 1C with the above-mentioned configurations, the thickness of the constraining layer 3 will depend in part on the constituent material, however, it is preferably about 10 to 300 µm, and more preferably 50 to 100 µm. If the thickness of the constraining layer 3 is too thin, then, depending on the constituent material, there is the risk that adequate reinforcing ability will not be obtained. On the other hand if the thickness of the constraining layer 3 is too thick, then the layer becomes heavier and the rigidity will increase, thereby reducing the ability to follow contours.

when the constraining layer 3 comprises the various metal materials described above, it is preferable to make its thickness relatively thin, for example about 50 to 100 µm. By doing so, it becomes possible to give adequate flexibility (softness) to the vibration damping sheet 1A to 1C and impart an excellent ability to follow contours.

The thickness of the binder layer 4 is preferably about 10 to 500 µm, and more preferably 50 to 300 µm. If the thickness of the binder layer 4 is too thin, there is the risk that an adequate adhesive force will not be obtained. while if the thickness of the binder layer 4 is too thick the convertibility of the sheet will be impaired.

The thickness of the vibration-damping layer 5 is preferably about 1 to 10 mm and more preferably about 1 to 4 mm. If the thickness of the vibration-damping layer 5 is too thin, then, depending on the constituent material, there is the risk that an adequate vibration-damping performance will not be obtained. On the other hand, if the thickness of the vibration-damping layer 5 is too thick, the layer becomes heavier, which results in the reduction of the ability to follow the shape of the adherend to which the material is applied.

The thickness of the hardenable pressure sensitive adhesive layer 6 is preferably about 10 to 200 µm, and more preferably about 20 to 100 µm. If the thickness of the hardenable pressure sensitive adhesive layer 6 is too thin, there is the risk that an adequate adhesive force will not be obtained, while if the thickness of the hardenable pressure sensitive adhesive layer 6 is too thick, the convertibility of the sheet will be impaired.

The thickness of the barrier layer 8 is preferably about 0.1 to 25 µm, and more preferably about 0.5 to 5 µm. If the thickness of the barrier layer 8 is too thin, it will have a reduced ability to prevent migration of materials, depending on the type and the amount of the organic constituents contained in the other layers.

It should be noted that the form which the reinforcing and vibration-damping sheet of the present invention takes may be any form such as a sheet of large, medium or small dimension, a label or a long tape.

Hereinbelow, the method of use and the functions of the reinforcing and vibration-damping sheet according to the present invention are now described with reference to an example case in which a reinforcing and vibration-damping sheet, which has a vibration-damping layer 5 whose main constituent is unvulcanized rubber, is applied to the body of an automobile.

When a reinforcing and vibration-damping material 1A, 1B or 1C of the present invention is applied to the body (for example the floor panel, ceiling, back of the door, sides of the trunk compartment etc.) of an automobile (before it is completed), the release liner 7 is first peeled off. Then, the reinforcing and vibration damping material is applied to the automobile using the exposed hardenable pressure sensitive adhesive layer 6, thereby it is temporarily attached thereto. When this is completed, because the vibration-damping layer 5 and the hardenable pressure sensitive adhesive layer 6 are resilient, it readily changes its shape plastically even if the surface of the adherend is uneven or curved to some extent. As a result, it will readily follow or absorb the unevenness and will be tightly applied without gaps. Further, it will not peel even if a long time lapses. In addition, the application can be performed with good operational efficiency.

The body of the automobile is usually sent for paint baking during the process of producing the automobile. Thus, the vulcanization of the vibration-damping layer 5 and the curing of a thermocuring type of hardenable pressure sensitive adhesive layer 6 are achieved using the heat of the paint baking of the vehicle body to which a reinforcing and vibration-damping material 1A to 1C has been applied. As a result, the vibration-damping layer 5 cures to exhibit excellent vibration-damping properties and the hardenable pressure sensitive adhesive layer 6 cures to provide a strong adhesive force, after cooling. In this way, the curing of the vibration-damping layer 5, by vulcanization, and the curing of the hardenable pressure sensitive adhesive layer 6 do not require the addition of a special process, since curing is achieved by using the heat during paint baking. Therefore, there is no impairment to operational efficiency or production efficiency.

In this regard, it should be noted that the heating conditions for the vulcanization of the vibration-damping layer 5 and the curing of a thermally curing type of hardenable pressure sensitive adhesive layer 6 are preferably about 100° to 180° C. for 3 to 60 minutes, and more preferably 140° to 150° C. for 20 to 40 minutes. The above-mentioned heat conditions of paint baking coincide with or encompass this range.

When the respective constituent layers are formed from a material which transmits light, the hardenable pressure sensitive adhesive layer 6 may be a light-curing type of hardenable pressure sensitive adhesive layer. As a result, it can be cured by irradiating light (for example visible light, ultraviolet rays, electromagnetic waves).

When using a reinforcing and vibration-damping material 1A to 1C which uses an anaerobically curing type of hardenable pressure sensitive adhesive layer 6, curing will begin by applying the sheet to the vehicle body since air will be blocked from the hardenable pressure sensitive adhesive layer 6. Therefore, a strong adhesive force will be obtained upon completion of curing In addition, because the ability to follow a curved surface is excellent and the hardenable pressure sensitive adhesive layer 6 will be applied without gaps as discussed above, the anaerobic curing will proceed rapidly and reliably and the strong adhesive force will be maintained.

The reinforcing and vibration-damping material of the present invention is not limited to use on automobile bodies as mentioned above. It can also be applied, for example, in various places in the chassis, trunk compartments, bodies and around the engines of vehicles including automobiles, aircraft, building machinery and the like. In addition, it can also be applied in a variety of places such as various domestic electrical appliances like air conditioners, refrigerators, washing machines, and ventilating fans; gas appliances such as water boilers and hot-bath boilers; various items of office equipment such as photocopiers, printers, facsimiles and audio equipment; various items of industrial equipment such as compressors, hoppers, lathes, milling machines, electrically operated tools; various motors and precision devices; construction and civil engineering materials such as flooring, ceilings, Japanese-style shutters, window frames, roofs, Western-style shutters, doors, soundproof walls, quake-proof walls, gas pipes and water pipes; office furniture such as steel desks, chairs and stationary cupboards; daily necessities and sports products such as metal containers, grips of golf clubs, bats and racquets, skis and helmets.

THE DETAILED DESCRIPTION OF THE PREFERRED EMBODIMENTS

The present invention will now be described in more detail with reference to the following embodiments.

(Embodiment 1)

The reinforcing and vibration-damping material, with the configuration shown in FIG. 1, was produced as follows.

[Production of a vibration-damping layer 5]

A rubber starting material was kneaded in a kneader and then milled with additives. The resulting milled basestock was press formed, extrusion formed and calendar formed on casting paper to form a sheet with a size of 400 mm×1,000 mm.

[Production of a binder layer 4]

A thermosetting hardenable pressure sensitive adhesive composition, in which a sticking polymer, reactive oligomer and polymerization initiator have been adjusted utilizing diluting solvents, was coated onto one side of a release liner 7, both sides of which had undergone silicone processing. Thereafter, drying was carried out at 60° to 100° C. for 0.5 to 10 minutes in such a way that the dried thickness was 10 to 200 µm. Then, a non-carrier sheet was obtained by winding it in such a way that the coated surface and the rear surface of the release liner 7 were applied together.

[Production of a hardenable pressure sensitive adhesive layer 6]

A solution of hardenable pressure sensitive adhesive composition was applied to one side of a release liner 7, both sides of which had undergone silicone processing and then dried it 60° to 100° C. for 0.5 to 10 minutes in such a way that the dried thickness thereof was 10 to 200 µm. Then, a non-carrier sheet was obtained by winding it in such a way that the coated surface and the rear surface of the release liner 7 were applied together.

[Laminate of the respective layers]

The non-carrier sheets obtained according to the above processes were applied together in sequence on the vibration-damping layer or constraining layer to obtain reinforcing and vibration-damping material.

The configurations and the conditions of the respective layers are as outlined below.

Constraining Layer 3 Material: Stainless steel (SUS304)
  Thickness: 50 µm
Binder Layer 4
  Composition:
    Sticking polymer:
      an acrylic-based pressure sensitive adhesive (produced by Nippon Carbide Industries Inc.) (PE-121 (product number)) 100 parts by weight
      Reactive oligomer: an epoxy acrylate (produced by Showa Highpolymer Co., Ltd. (REPOXY H-6001 (tradename)) 10 parts by weight
      Polymerization initiator: an organic peroxide 2 parts by weight
    Thickness: 100 µm
    Modulus dynamic shearing elasticity after curing: 1.3× $10^9$ dyn/cm$^2$
Vibration-damping Layer 5
  Composition:
    Unvulcanized styrene butadiene rubber 60 parts by weight
    Styrene resin 40 parts by weight
    Calcium carbonate 200 parts by weight
    Vulcanizing agent: fine powdered sulfur 44 parts by weight
    Vulcanization accelerator: zinc flowers 5 parts by weight
    Reinforcing agents/additives 85 parts by weight
  Thickness: 2.0 mm
  Mooney viscosity before vulcanization ($ML_{1+4}(100°$ C.)): 40
  Rubber hardness after vulcanisation (JIS K-6301, JIS-A model hardness meter): 80
  Modulus of dynamic shearing elasticity after vulcanization: 3.8×$10^8$ dyn/cm$^2$
Hardenable Pressure Sensitive Adhesive Layer 6
  Composition:
    Sticking polymer:
      an acrylic-based pressure sensitive adhesive (produced by Nippon Carbide Industries Inc.) (PE-121 (product number)) 100 parts by weight
    Reactive oligomer:
      an epoxy acrylate (produced by Showa Highpolymer Co., Ltd.) (REPOXY H-6001 (tradename)) 10 parts by weight
    Polymerization initiator:
      an organic peroxide 4 parts by weight
    Thickness: 100 µm
Release Liner 7
  A double sided release liner comprising a paper and polyethylene films laminated on both sides of the paper (produced by Lintec Corporation)

(Embodiment 2)

A reinforcing and vibration-damping material with the configuration shown in FIG. 1 was produced utilizing the same method as in Embodiment 1 except that the vibration-damping layer 5 was produced as follows. In order to produce the vibration-damping layer, asphalt, rubber, synthetic resin powder and pigment were respectively combined in appropriate amounts and melted and milled in a mixing roller, and the resulting mixture was formed into a sheet with a size of 400 mm×1,000 mm by press forming or extrusion forming.

Vibration-damping Layer 5

Composition: Rubber asphalt (produced by Asahi Corporation) (NW-131 (product number))

Thickness: 3.6 mm

Modulus of dynamic shearing elasticity: $1.6 \times 10^8$ dyn/cm$^2$ (Embodiment 3)

A reinforcing and vibration-damping material, with the configuration shown in FIG. 2, was produced. The configuration and conditions of the layers were as given below. In addition, a barrier layer 8 was formed on the surface of the vibration-damping layer 5 (unvulcanized rubber sheet) by a coating method.

Constraining Layer 3

Material and thickness:

Same as those of the Embodiment 1

Binder Layer 4

Composition:

Epoxy-based adhesive (produced by Cemedyne Corporation) (CEMEDYNE HIGHKCOOK, its tradename)

Thickness: 200 μm

Modulus of dynamic shearing elasticity after curing: $4.8 \times 10^{10}$ dyn/cm$^2$ Vibration-damping Layer 5

Composition, physical properties and thickness:

Same as those of the Embodiment

Barrier Layer 8

Composition:

Polyvinylidene chloride (produced by Kureha Chemical Co., Ltd.) (KUREHARON LATEX RA, its tradename)

Thickness: 5 μm

Hardenable Pessure Sensitive Adhesive Layer 6

Composition and thickness:

Same as those of the Embodiment 1

Release Liner 7

Same as that of the Embodiment 1

(Embodiment 4)

A reinforcing and vibration-damping material, with the configuration shown in FIG. 3, was produced. The configuration and conditions of the respective layers are as follows. The respective layers were produced utilizing the same method as in Embodiment 1 mentioned above.

Vibration-damping Layer 5

Composition, physical properties and thickness:

Same as those of the Embodiment 1

Binder Layer 4

Composition:

An acrylic-based pressure sensitive adhesive (produced by Lintec Corporation, (PK, its product name)

Thickness: 50 μm

Modulus of dynamic shearing elasticity: $2.8 \times 10^6$ dyn/cm$^2$

Constraining Layer 3

Materials and thickness:

Same as those of the Embodiment 1

Hardenable Pressure Sensitive Adhesive Layer 6

Composition and thickness:

Same as those of the Embodiment 1

Release Liner 7

Same as those of the Embodiment 1

(Embodiment 5)

A reinforcing and vibration-damping material with the configuration shown in FIG. 3, was produced utilizing the same method as in Embodiment 4 except that the same vibration-damping layer as in Embodiment 2 above (rubber asphalt, thickness of 3.6 mm) was utilized as the vibration-damping layer 5. The respective layers were produced utilizing the same method as in Embodiment 2 above.

(Comparative example 1)

A reinforcing material was produced with an adhesive layer, having the same composition as in Embodiment 3 above (an epoxy-based adhesive, thickness 3.0 mm), on one side of a constraining layer, which is the same as in Embodiment 1 above (SUS304, thickness 50 μm).

(Comparative example 2)

A vibration-damping material was produced in which the binder layer, of Embodiment 4 above (acrylic-based pressure sensitive adhesive, thickness 50 μm) was on one side of the vibration-damping layer, of Embodiment 2 above (rubber asphalt, thickness 3.6 mm), and in which the release liner, of Embodiment 1 above, was covered onto the binder layer.

The materials (sheets) of the above-mentioned Embodiments 1 to 5 and Comparative examples 1 and 2 were tested in the following ways.

<1> Measuring the reinforcing properties

The materials (sheets) of Embodiments 1 to 5 and Comparative examples 1 and 2 were cut into 50 mm×150 mm sizes. In Embodiments 1 to 5 and Comparative example 2, the release material was removed and then they were respectively applied onto steel panels for automobiles of 80 mm×200 mm×thickness of 0.8 mm to create test pieces.

Next, the test pieces were heat-processed in an oven at about 140° C. for 30 minutes, cooled to close to room temperature, thereby curing the unvulcanized rubber and hardenable pressure sensitive adhesive.

Figure 4:
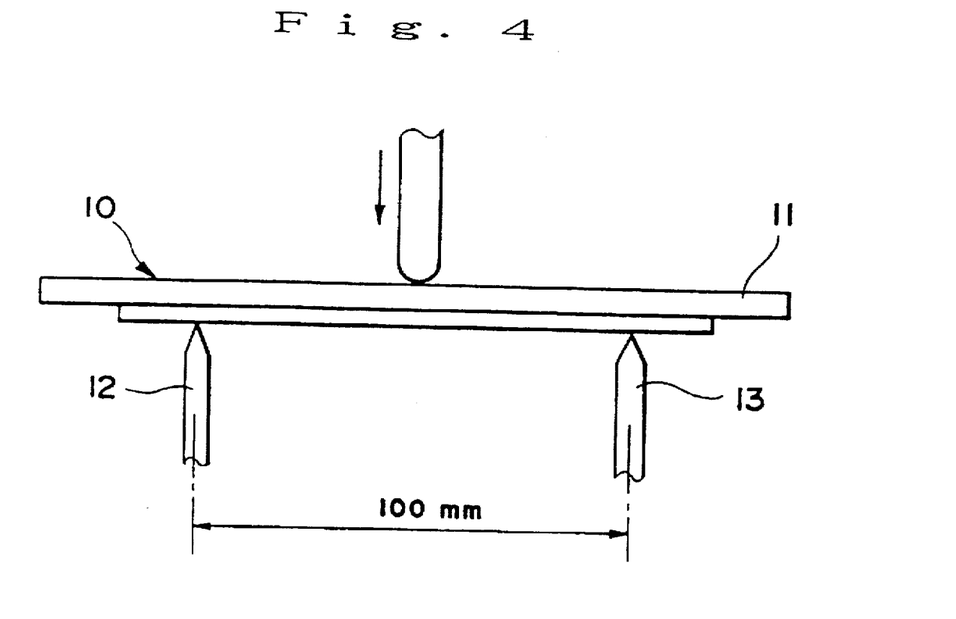
FIG. 4 is a side view which illustrates the measuring method of the reinforcing property.

As illustrated in FIG. 4, the test pieces 10 were placed on a pair of knife edges 12 and 13, which were 100 mm apart, in such a way that the steel automobile plate 11 was uppermost. A load was applied to the central area and measurements were taken of the maximum bending strength and the bending strength at a 2 mm displacement at the loading point. Measurements were also taken for steel panels for automobiles alone. The results are shown in the following Table 1.

It should be that the measurements were taken under the following conditions.

Test rate: 5.0 mm/min

Load distance: 30 mm

Total amount of displacement: 30 mm

<2> Measuring adhesive properties

The materials (sheets) of Embodiments 1 to 5 and Comparative examples 1 and 2 were cut into sizes of 15 mm×150 mm. For embodiments 1 to 5 and Comparative example 2, the release liner was removed, and then they were respectively applied to steel panels of 100 mm×300 mm to create test pieces.

Next, the test pieces were left for 72 hours under environmental conditions of 20°±2° C., 65±10% RH, and then subjected to heat-processing at 140°±2° C. for 30 minutes, and cooled to 20° C.

The test pieces were applied to the front edge of the rotating angle (rotational radius: 915 mm) of a JIS K-6830 impact testing machine. The angle was then swung down to make an impact with the test piece. measurements were taken of the initial angle with respect to the perpendicular of the angle when the sheet peeled away from the steel panel. The adhesive properties were evaluated by the size of this angle (the greater the angle the better (excellent) impact resistance, that is to say, adhesive properties). The results are shown in Table 1 which follows.

TABLE 1

| | Reinforcing Properties | | |
|---|---|---|---|
| | Max Bending Strength (kgf) | Bending Strength at 2 mm Displacement | Adhesive Properties |
| Embodiment 1 | 51.9 | 21.0 | more than 90° |
| Embodiment 2 | 43.1 | 15.4 | more than 90° |
| Embodiment 3 | 53.5 | 22.8 | more than 90° |
| Embodiment 4 | 41.3 | 12.7 | more than 90° |
| Embodiment 5 | 38.6 | 11.2 | more than 90° |
| Comparative Example 1 | 45.9 | 16.4 | more than 90° |
| Comparative Example 2 | 17.6 | 3.1 | 80° |
| Steel Panel | 12.4 | 2.0 | — |

<3> Measuring the vibration-damping properties

The materials (sheets) of Embodiments 1 to 5 and Comparative examples 1 and 2 were cut into sizes of 30 mm×300 mm. For Embodiments 1 to 5 and Comparative example 2, the release sheet was removed, and the sheets were applied to steel automobile panels of the same size to create test pieces.

Then, the test pieces were heat-treated in an oven at about 140° C. for 30 minutes and cooled to close to room temperature, thereby curing the unvulcanized rubber and hardenable pressure sensitive adhesive.

The test pieces obtained, as described above, were vibrated using free-ends, center-supported method (measuring frequency: 500 Hz). Measurements were taken of the loss coefficient η at 20° C. intervals in a range of temperatures from 0° to 60° C. to evaluate the vibration-damping performance. The results are shown in Table 2 which follows.

TABLE 2

| | Loss Coefficient | | | |
|---|---|---|---|---|
| Temperature (°C.) | 0 | 20 | 40 | 60 |
| Embodiment 1 | — | 0.13 | 0.14 | 0.38 |
| Embodiment 2 | — | 0.14 | 0.15 | 0.51 |
| Embodiment 3 | — | 0.12 | 0.14 | 0.37 |
| Embodiment 4 | 0.07 | 0.22 | 0.24 | 0.20 |
| Embodiment 5 | 0.09 | 0.24 | 0.28 | 0.14 |
| Comparative Example 1 | — | — | 0.06 | 0.05 |
| Comparative Example 2 | 0.11 | 0.21 | 0.15 | 0.04 |

<4> Results of measurements

As shown in Table 1 and Table 2 above, it was confirmed that the reinforcing and vibration-damping materials (sheets) of Embodiments 1 to 5 all had a strong bending strength and large loss coefficient η at high temperature. Therefore, they exhibit vibration-damping performance and excellent reinforcing properties irrespective of temperature. In addition, they have high reliability when they are applied to the adherend.

In contrast, although the sheet of Comparative example 1 did have some degree of reinforcing performance, it had few vibration-damping properties. Further, although the sheet of Comparative example 2 did have some degree of vibration-damping performance, it had little reinforcing effect. In addition, its adhesion was poorly reliable.

[Advantages of the invention]

As described above, the reinforcing and vibration-damping materials of the present invention have both excellent reinforcing performance and vibration-damping performance. In addition, they provide highly reliable adhesion without reducing operational efficiency when they are applied to the adherend.

Further, since the reinforcing and vibration-damping materials of the present invention are also able to follow the shapes of adherends, they can be easily applied to curved surfaces.

Finally, it should be noted that the present invention is not limited to the embodiments described above, and the scope of the present invention will be determined only by the following claims.

What is claimed is:

1. A reinforcing and vibration-damping material to be stuck to an adherend, the reinforcing and vibration-damping material is formed into a laminate body, the laminate body comprising:

a constraining layer having a thickness up to 300 μm acting to reinforce the adherend when the reinforcing and vibration-damping material is stuck to the adherend;

a vibration-damping layer having a thickness up to 10 mm, the vibration-damping layer being formed of a viscoelastic material which comprises unvulcanized rubber as a main component and a vulcanizing agent; wherein said unvulcanized rubber of said viscoelastic material has a rubber viscosity of 10 to 80 measured according to JIS K-6300 Rotor L Model Mooney viscometer $ML_{1+4}(100°\ C.)$ before vulcanization of the viscoelastic material, and wherein the vibration-damping layer is adapted to have a modulus of dynamic shearing elasticity of $10^6$ to $10^{10}$ dyn/cm$^2$ after vulcanization of the vibration-damping layer, and said vibration-damping layer being adapted to be vulcanized after the vibration damping material is stuck onto an adherend to exhibit vibration-damping effect to the adherend; and a binder layer interposed between said constraining layer and said vibration-damping layer and bonding the constraining layer to the vibration-damping layer.

2. The reinforcing and vibration-damping material as claimed in claim 1, wherein the vibration-damping layer has a first side on which the constraining layer is positioned and a second side opposite to the first side, and wherein the laminate body further comprises a hardenable pressure sensitive adhesive layer provided on the second side of said vibration-damping layer of said laminate body, and a release liner stuck onto the opposite side of said hardenable pressure sensitive layer.

3. The reinforcing and vibration-damping material as claimed in claim 2, wherein the laminate body further comprises a barrier layer provided between said vibration-damping layer and said hardenable pressure sensitive adhesive layer for blocking migration of organic components contained in either of the vibration-damping layer or the hardenable pressure sensitive adhesive layer into the other layer.

4. The reinforcing and vibration-damping material as claimed in claim 1, wherein the constraining layer has a first side on which the vibration-damping layer is positioned and a second side opposite to the first side, and wherein the laminate body further comprises a hardenable pressure sensitive adhesive layer provided on the second side of said constraining layer of said laminate body, and a release liner stuck onto the opposite side of said hardenable pressure sensitive adhesive layer.

5. The reinforcing and vibration-damping material as claimed in claims 2, 3 or 4, wherein said hardenable pressure sensitive adhesive layer contains a sticking polymer, a reactive oligomer and a polymerization initiator.

6. The reinforcing and vibration-damping material as claimed in claim 1, wherein said vibration-damping layer is formed of an elastomer material.

7. The reinforcing and vibration-damping material as claimed in claim 1, wherein said vibration-damping layer is formed of a material containing rubber and asphalt.

8. The reinforcing and vibration-damping material as claimed in claim 1, wherein said binder layer is formed of a pressure sensitive adhesive, a bonding agent or a hardenable pressure sensitive adhesive.

9. A reinforcing and vibration-damping material to be stuck to an adherend, the reinforcing and vibration-damping material is formed into a laminate body, the laminate body comprising:

a constraining layer having a thickness up to 300 μm acting to reinforce the adherend;

a single vibration-damping layer having a thickness up to 10 mm acting to damp vibration in the adherend, the vibration-damping layer being formed of an elastic or viscoelastic material containing rubber asphalt wherein the rubber asphalt comprises 1 to 20 parts by weight rubber with respect to 100 parts by weight asphalt; and, a binder layer interposed between the constraining layer and the vibration-damping layer to bond the constraining layer to the vibration-damping layer.

10. The reinforcing and vibration damping material as claimed in claim 9, wherein said vibration-damping layer has a first side on which the constraining layer is provided and a second side opposite to the first side, and wherein the laminate body further comprises a hardenable pressure sensitive adhesive layer provided on the second side of the vibration-damping layer, and a release liner stuck onto the opposite side of the hardenable pressure sensitive adhesive layer.

11. The reinforcing and vibration-damping material as claimed in any one of claims 5, 9, or 10, wherein the hardenable pressure sensitive adhesive layer contains a sticking polymer, a reactive oligomer and a polymerization initiator.

12. The reinforcing and vibration-damping material as claimed in claim 9, wherein the laminate body further comprises a barrier layer provided between the vibration-damping layer and the hardenable pressure sensitive adhesive layer for blocking migration of organic components contained in either of the vibration-damping layer or the hardenable pressure sensitive adhesive layer into the other layers.

13. The reinforcing and vibration-damping material as claimed in claim 9, wherein the constraining layer has a first side on which the vibration-damping layer is positioned and a second side opposite to the first side, and wherein the laminate body further comprises a hardenable pressure sensitive adhesive layer provided on the second side of the constraining layer, and a release liner stuck onto the opposite side of the hardenable pressure sensitive adhesive layer.

14. The reinforcing and vibration-damping material as claimed in claim 9, wherein the binder layer is formed of a pressure sensitive adhesive, a bonding agent or a hardenable pressure sensitive adhesive.

* * * * *